US012770626B2

(12) United States Patent
Beack et al.

(10) Patent No.: US 12,770,626 B2
(45) Date of Patent: Oct. 20, 2026

(54) ENCODING METHOD AND ENCODING DEVICE USING COMPLEX SIGNAL AND DECODING METHOD AND DECODING DEVICE USING COMPLEX SIGNAL

(71) Applicant: Electronics and Telecommunications Research Institute, Daejeon (KR)

(72) Inventors: Seung Kwon Beack, Daejeon (KR); Jongmo Sung, Daejeon (KR); Tae Jin Lee, Sejong-si (KR); Woo-taek Lim, Sejong-si (KR); Inseon Jang, Daejeon (KR); Byeongho Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 242 days.

(21) Appl. No.: 18/108,431

(22) Filed: Jun. 12, 2023

(65) Prior Publication Data

US 2023/0298599 A1 Sep. 21, 2023

(51) Int. Cl.
*G10L 19/008* (2013.01)

(52) U.S. Cl.
CPC .................................. *G10L 19/008* (2013.01)

(58) Field of Classification Search
CPC ......... G10L 19/00; G10L 19/06; G10L 19/04; G10L 19/0018; G10L 19/005; G10L 19/08; G10L 19/008; G10L 19/0017; G10L 19/02; G10L 19/022; G10L 19/0204; G10L 19/025; G10L 19/07; G10L 19/173; G10L 19/18; G10L 19/20; G10L 19/22; G10L 19/24; G10L 21/01; G10L 21/003; G10L 21/013; G10L 21/0308; G10L 21/0316;
(Continued)

(56) References Cited

U.S. PATENT DOCUMENTS

| | | | |
|---|---|---|---|
| 8,255,228 B2 | 8/2012 | Hilpert et al. | |
| 11,430,457 B2 | 8/2022 | Beack et al. | |
| 2006/0190247 A1* | 8/2006 | Lindblom | H04S 3/008 704/230 |
| 2010/0014679 A1* | 1/2010 | Kim | G10L 19/008 381/23 |

(Continued)

OTHER PUBLICATIONS

Max Neuendorf et al., "MPEG Unified Speech and Audio Coding The ISO/MPEG Standard for High-Efficiency Audio Coding of all Content Types", Audio Engineering Society 132nd Convention, Budapest, Hungary, Apr. 26-29, 2012.

*Primary Examiner* — Leshui Zhang
(74) *Attorney, Agent, or Firm* — KILE PARK REED & HOUTTEMAN PLLC

(57) ABSTRACT

An encoding method and an encoding device using a complex signal and a decoding method and a decoding device using a complex signal are provided. The encoding method includes converting a first channel signal and a second channel signal constituting an audio signal corresponding to a stereo signal from a real domain to a complex domain, determining one of a sum operation, a difference operation, and a bypass operation to be performed on the second channel signal converted to the complex domain, determining a complex spatial cue according to the determined operation, converting a residual signal for the second channel signal to a real domain using the complex spatial cue, converting the first channel signal to a real domain, encoding the first channel signal converted to the real domain, and encoding the residual signal for the second channel signal converted to the real domain.

2 Claims, 4 Drawing Sheets

(58) Field of Classification Search
CPC ............. G10L 21/0332; G10L 21/8324; G10L 21/034; G10L 21/0364; G10L 21/03646; G10L 21/0388; G10L 21/038; G10L 25/06; G10L 25/12; G10L 25/18; G10L 25/21; G10L 25/24; G10L 25/39; G10L 25/45; G10L 25/72; G10L 25/78; G10L 25/81; G10L 25/87; G10L 25/93; G10L 2025/783; G10L 2025/786; G10L 2025/906; G10L 2025/932; G10L 2025/935; G10L 2025/937; H04S 1/007; H04S 3/008
USPC ................... 704/500–504; 381/1–23; 700/94
See application file for complete search history.

(56) References Cited

U.S. PATENT DOCUMENTS

| | | | | |
|---|---|---|---|---|
| 2010/0063808 | A1* | 3/2010 | Gao | G10L 19/03 704/226 |
| 2011/0238425 | A1* | 9/2011 | Neuendorf | G10L 19/008 704/500 |
| 2013/0028426 | A1* | 1/2013 | Purnhagen | G10L 19/0212 381/23 |
| 2013/0030819 | A1* | 1/2013 | Purnhagen | G10L 19/008 704/500 |
| 2016/0142846 | A1* | 5/2016 | Herre | H04S 3/008 381/23 |
| 2018/0197552 | A1* | 7/2018 | Fuchs | G10L 19/008 |
| 2020/0258531 | A1 | 8/2020 | Purnhagen et al. | |
| 2021/0005208 | A1 | 1/2021 | Beack et al. | |

* cited by examiner

ENCODING METHOD AND ENCODING DEVICE USING COMPLEX SIGNAL AND DECODING METHOD AND DECODING DEVICE USING COMPLEX SIGNAL

CROSS-REFERENCE TO RELATED APPLICATION

This application claims the benefit of Korean Patent Application No. 10-2022-0018299 filed on Feb. 11, 2022, in the Korean Intellectual Property Office, the entire disclosure of which is incorporated herein by reference for all purposes.

BACKGROUND

1. Field of the Invention

One or more embodiments relate to an encoding method and an encoding device using a complex signal and a decoding method and a decoding device using a complex signal.

2. Description of the Related Art

An audio signal including a plurality of channels may be encoded in a basic unit, such as a stereo channel. To encode a multi-channel audio signal, there is a need for reflecting correlation between channels as much as possible.

In addition, by maximizing a reduction in an amount of information between channels of an audio signal, efficiency of encoding of the audio signal needs to be increased.

SUMMARY

One or more embodiments provide a method and device for increasing an efficiency of audio encoding by maximizing a reduction in an amount of information between audio channels through reflecting correlation between channels as much as possible.

According to an aspect, there is provided an encoding method including converting a first channel signal and a second channel signal constituting an audio signal corresponding to a stereo signal from a real domain to a complex domain, determining one of a sum operation, a difference operation, and a bypass operation to be performed on the second channel signal converted to the complex domain, determining a complex spatial cue according to the determined operation, converting a residual signal for the second channel signal to a real domain using the complex spatial cue, converting the first channel signal to a real domain, encoding the first channel signal converted to the real domain, and encoding the residual signal for the second channel signal converted to the real domain.

The determining of one of the sum operation, the difference operation, and the bypass operation may include comparing power of the second channel signal to power of the residual signal for the second channel signal and determining one of the sum operation, the difference operation, and the bypass operation to be performed on the second channel signal based on a result of the comparing.

When the power of the residual signal for the second channel signal is less than the power of the second channel signal, the sum operation or the difference operation may be selected.

When the power of the residual signal for the second channel signal is greater than the power of the second channel signal, the bypass operation may be selected.

The complex spatial cue may be determined using the first channel signal converted to the complex domain and the second channel signal converted to the complex domain.

The residual signal for the second channel signal may be determined based on (i) the second channel signal and (ii) a difference between the first channel signal and the second channel signal that is modified through the complex spatial cue.

According to another aspect, there is provided a decoding method including decoding an encoded first channel signal in a real domain, decoding a residual signal for an encoded second channel signal in a real domain, converting the first channel signal in the real domain and the residual signal for the second channel in the real domain to a complex domain, estimating the second channel signal that is modified by applying a complex spatial cue to the first channel signal, determining the second channel signal by using the residual signal for the second channel signal and the modified second channel signal, determining one of a sum operation, a difference operation, and a bypass operation to be performed on the second channel signal, and converting the first channel signal and the second channel signal, to which the determined operation is applied, from a complex domain to a real domain.

The determining of one of the sum operation, the difference operation, and the bypass operation may include comparing power of the determined second channel signal to power of the residual signal for the second channel signal and determining one of the sum operation, the difference operation, and the bypass operation to be performed on the second channel signal based on a result of the comparing The determining of one of the sum operation, the difference operation, and the bypass operation may include, when the power of the residual signal for the second channel signal is less than the power of the second channel signal, determining the sum operation or the difference operation.

The determining of one of the sum operation, the difference operation, and the bypass operation may include, when the power of the residual signal for the second channel signal is greater than the power of the second channel signal, determining the bypass operation.

The complex spatial cue may be determined using the first channel signal converted to the complex domain and the second channel signal converted to the complex domain.

According to another aspect, there is provided an encoding device including a processor and the processor is configured to convert a first channel signal and a second channel signal constituting an audio signal corresponding to a stereo signal from a real domain to a complex domain, determine one of a sum operation, a difference operation, and a bypass operation to be performed on the second channel signal converted to the complex domain, determine a complex spatial cue according to the determined operation, convert a residual signal for the second channel signal to a real domain using the complex spatial cue, convert the first channel signal to a real domain, encode the first channel signal converted to the real domain, and encode a residual signal for the second channel signal converted to the real domain.

The determining of one of the sum operation, the difference operation, and the bypass operation may include comparing power of the second channel signal to power of the residual signal for the second channel signal and determining one of the sum operation, the difference operation, and the bypass operation to be performed on the second channel signal based on a result of the comparing of power.

When the power of the residual signal for the second channel signal is less than the power of the second channel signal, the sum operation or the difference operation may be selected.

When the power of the residual signal for the second channel signal is greater than the power of the second channel signal, the bypass operation may be selected.

The complex spatial cue may be determined using the first channel signal converted to the complex domain and the second channel signal converted to the complex domain.

The residual signal for the second channel signal may be determined based on (i) the second channel signal and (ii) a difference between the first channel signal and the second channel that is modified through the complex spatial cue.

Additional aspects of embodiments will be set forth in part in the description which follows and, in part, will be apparent from the description, or may be learned by practice of the disclosure.

According to embodiments, an efficiency of audio encoding may be increased by maximizing a reduction in an amount of information between audio channels through reflecting correlation between channels as much as possible.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
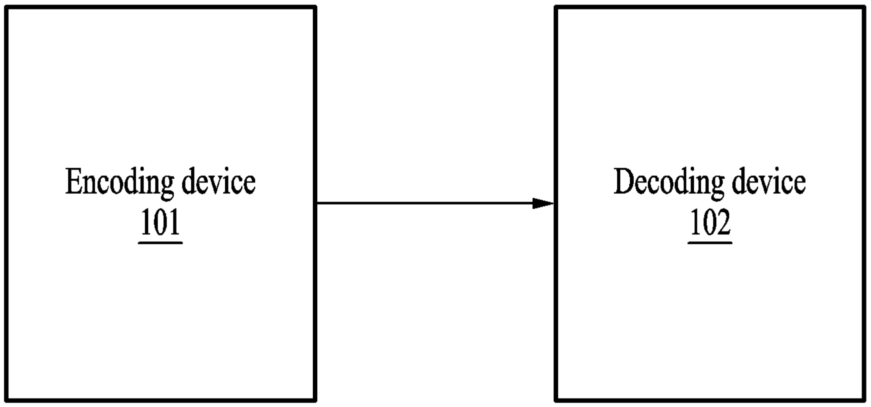
FIG. 1 is a diagram illustrating an encoding device and a decoding device according to an embodiment.

Hereinafter, embodiments will be described in detail with reference to the accompanying drawings. However, the scope of rights of a patent application is not limited by the embodiments. Like reference numerals in the drawings refer to like components.

Various modifications may be made to the embodiments described below. The below embodiments should be understood not to limit a form of embodiment but to include all modifications, equivalents, or substitutes to the embodiments.

Although terms of "first" or "second" are used to explain various components, the components are not limited to the terms. These terms should be used only to distinguish one component from another component. For example, a "first" component may be referred to as a "second" component, and similarly, the "second" component may be referred to as the "first" component within the scope of the right according to the concept of the present disclosure.

The terms used in the examples are merely meant for descriptive purposes and should not be construed as limiting. Singular forms are intended to include plural forms, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

In addition, when describing the embodiments with reference to the accompanying drawings, like reference numerals refer to like components and a repeated description related thereto will be omitted. When describing the embodiments, if it is determined that a detailed description of a related known art may unnecessarily obscure the gist of the examples, the detailed description will be omitted.

Hereinafter, embodiments of the present disclosure will be described in detail with reference to the accompanying drawings.

FIG. 1 is a diagram illustrating an encoding device and a decoding device according to an embodiment.

When an audio signal including a plurality of channels is input during an encoding process of the audio signal, multichannel audio encoding technology may need to be applied to increase efficiency of audio encoding. A basic unit of encoding technology for a multi-channel audio signal is a stereo unit, and encoding is performed based on a correlation between two channels or parameters for stereo coding.

Different processes may be applied to coding a stereo signal according to a bit rate. The present disclosure proposes encoding a multi-channel audio signal for a high quality. In particular, the present disclosure proposes a method of increasing an efficiency of audio encoding by maximizing a reduction in an amount of information between audio channels through reflecting a correlation between channels as much as possible.

Figure 2:
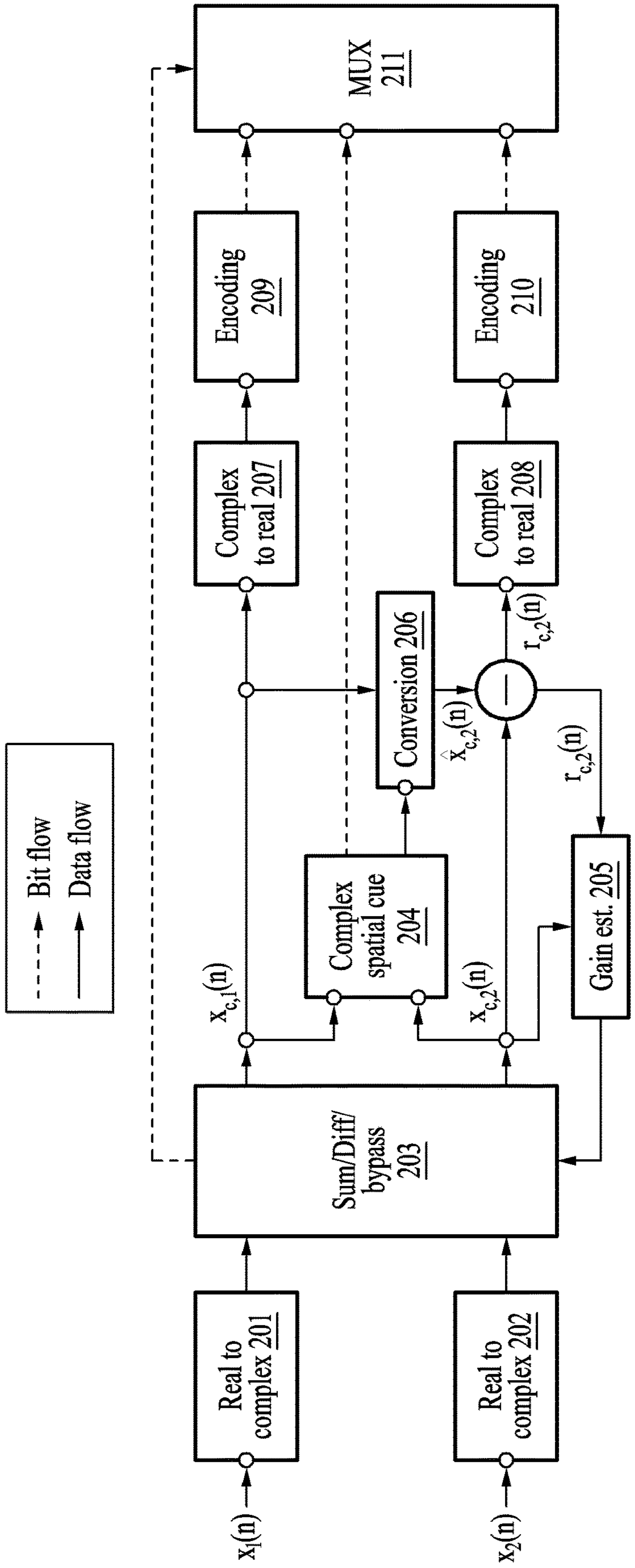
FIG. 2 is a flowchart illustrating an encoding process according to an embodiment.

FIG. 2 is a flowchart illustrating an encoding process according to an embodiment.

A multi-channel encoding process according to an embodiment may be performed according to a pair of channels. FIG. 2 illustrates an example in which two channels, for example, a first channel $x_1(n)$ and a second channel $x_2(n)$, which constitute a stereo channel, are input.

In operation 201, an encoding device 101 may convert an audio signal of the first channel from a real form to a complex form. In operation 202, the encoding device 101 may convert an audio signal of the second channel from a real form to a complex form.

Converting to the complex form may be performed as below.

The encoding device 101 may perform discrete Fourier transform (DFT) on an audio signal to generate a complex signal in a frequency domain or perform Hilbert transform on an audio signal to generate a complex signal in a time domain. Hereinafter, a process of converting an audio signal from a real form to a complex form using a Hilbert transform is described.

$$x_{c,i}(n) = x_i(n) + j \cdot HT\{x_i(n)\} \quad \text{[Equation 1]}$$

In Equation 1, HT{ } denotes a Hilbert transform. That is, if a Hilbert transform is performed, a complex signal may be extracted from the audio signal. When extracting the complex signal from the audio signal using the Hilbert transform as in Equation 1, there may be an, advantage of utilizing information in the time domain. However, when extracting the complex signal of the audio signal according to the Hilbert transform, there may be an issue of discontinuous distortion due to an abrupt change between time samples or an abrupt change in an analysis parameter between frames. In operation 206, an interpolation may be performed on the change between the time samples or between the frames.

In operation 203, the encoding device 101 may perform a sum operation, a difference operation, or a bypass operation on the audio signal of the first channel in the complex form and the audio signal of the second channel in the complex form. In operation 205, the encoding device 101 may perform a gain estimation process to determine whether or not to perform the sum operation, the difference operation, or the bypass operation.

In operation 204, the encoding device 101 may determine a complex spatial cue for the audio signal of the first channel in the complex form and the audio signal of the second channel in the complex form.

In operation 205, gain estimation is performed as described below.

In operation 205, the encoding device 101 may compare (i) $r_{c,2}(n)$, which is a difference between $\hat{x}_{c,2}(n)$ and $x_{c,2}(n)$ output in operation 206, to (ii) $x_{c,2}(n)$. If power of $r_{c,2}(n)$ is less than power of $x_{c,2}(n)$, the sum operation or the difference operation may be selected in operation 203. If the power of $r_{c,2}(n)$ is greater than the power of $x_{c,2}(n)$, the bypass operation may be performed in operation 203 to output an original complex signal.

Here, $\hat{x}_{c,2}(n)$ may be a signal generated from $x_{c,1}(n)$ through the complex spatial cue in operation 204. The complex spatial cue may be derived from $x_{c,1}(n)$ and $x_{c,2}(n)$. According to an embodiment, two types of complex cues may be used.

$$\theta_c = a\tan\left(\frac{imag\left(\sum_0^{M-1} x_{c,1}(n)\cdot conj(x_{c,2}(n))\right)}{\mathrm{real}\left(\sum_0^{M-1} x_{c,1}(n)\cdot conj(x_{c,2}(n))\right)}\right) \quad \text{[Equation 2]}$$

$$g_c = \sqrt{\frac{\sum_0^{M-1}|x_{c,1}(n)|^2}{\sum_0^{M-1}|x_{c,2}(n)|^2}} \quad \text{[Equation 3]}$$

Equation 2 may represent a difference in phases between two signals, and Equation 3 may represent a difference in gains between the two signals. According to an embodiment, the complex spatial cue may be extracted from the complex signal of the audio signal, and an encoding efficiency may be increased by generating a differential signal $\hat{x}_{c,2}(n)$ and a residual signal $\hat{r}_{c,2}(n)$.

The encoding device 101 may output $\hat{x}_{c,2}(n)$ by correcting the difference in gains and a gain value in operation 206 using the complex spatial cue generated in operation 204. The encoding device 101 may output $\hat{x}_{c,2}(n)$ based on Equation 4.

$$\hat{x}_{c,2}(n) = \frac{|x_{c,1}(n)|e^{i\angle x_{c,1}(n)-\theta_c}}{g_c} \quad \text{[Equation 4]}$$

In Equation 4, M may be associated with an analysis section and denotes a frame unit or a subframe unit to divide the frame. The complex spatial cue may be derived as one frame unit or as a plurality of subframes in one frame.

The encoding device 101 may output the residual signal $r_{c,2}(n)$, which is a difference between $x_{c,2}(n)$ and $\hat{x}_{c,2}(n)$. The residual signal may be converted from the complex domain to the real domain in operation 208, and encoded in operation 210. If power of $r_{c,2}(n)$ is not greater than power of $x_{c,2}(n)$, it is determined that $r_{c,2}(n)==x_{c,2}(n)$.

In operation 205, the encoding device 101 may measure energy gains according to each input format, compare the energy gains to one another, and determine an input layout. The input layout may be determined to be one of sum, diff, and bypass. $x_{c,2}(n)$ may be determined to be one of sum, diff, and bypass. For example, if $x_{c,2}(n)$ is sum, $x_{c,1}(n)$ may be determined to be diff. If $x_{c,2}(n)$ is diff, $x_{c,1}(n)$ may be determined to be a sum signal. Sum may be a sum of two channels and diff may be a difference between the two channels.

In the case of bypass, an input signal may be determined to be $x_2(n)$. A signal-to-noise ratio (SNR) of a gain value measured in operation 205 may be used so that $x_{c,2}(n)$ may be determined to be one of the sum operation, the difference operation, and the bypass operation. The SNR of the gain value may be three types according to the input layout.

$$SNR^{type} = \log_{10}\frac{pow\left(x_{c,2}^{type}(n)\right)}{pow\left(r_{c,2}^{type}(n)\right)} \quad \text{[Equation 5]}$$

In Equation 5, sum, diff, bypass, which are the three types of $$x_{c,2}^{type}(n),$$

may be determined as in Equation 6.

$$x_{c,2}^{sum}(n) = \mathrm{real\_to\_complex}\{x_1(n)\} + \mathrm{real\_to\_complex}\{x_2(n)\} \quad \text{[Equation 6]}$$

$$x_{c,2}^{diff}(n) = \mathrm{real\_to\_complex}\{x_1(n)\} - \mathrm{real\_to\_complex}\{x_2(n)\}$$

$$x_{c,2}^{bypass}(n) = \mathrm{real\_to\_complex}\{x_2(n)\}$$

A type to be determined by Equation 5 may be determined to be a type having the largest SNR among SNRs of each operation defined in Equation 6. $r_{c,2}(n)$ may be determined according to the selected type. $r_{c,2}(n)$ may be converted from the complex domain to the real domain in operation 208 and may be encoded in operation 210. If defined as $$x_{c,2}^{sum}(n)$$

by Equation 6, $$x_{c,1}^{diff}(n)$$

may be automatically defined. Similarly, if defined as $$x_{c,2}^{diff}(n),$$

$$x_{c,1}^{sum}(n)$$

may be automatically defined.

Figure 3:
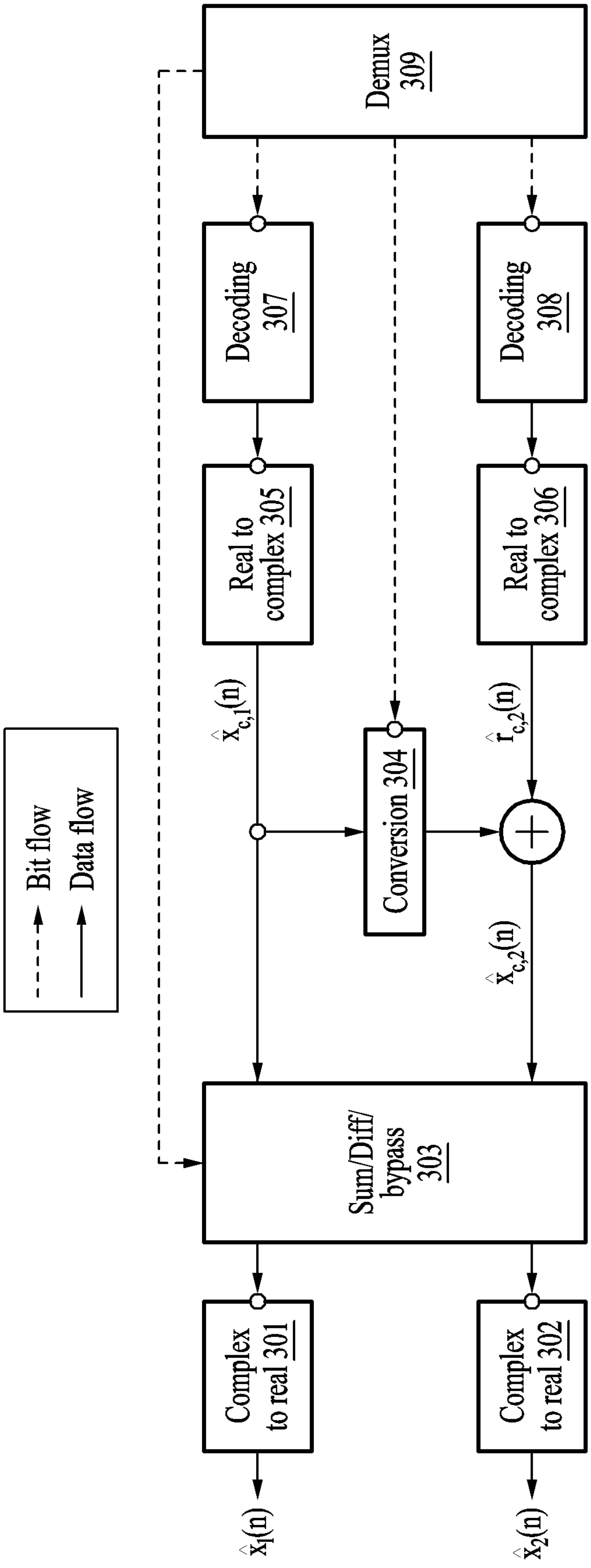
FIG. 3 is a flowchart illustrating a decoding process according to an embodiment.

FIG. 3 is a flowchart illustrating a decoding process according to an embodiment.

A decoding process may be a reverse process of the encoding process, and the block on the right side of FIG. 3 represents the decoding process. Each of encoding signals may be decoded through a "decoding block," and $\hat{x}_{c,1}(n)$ and $\hat{r}_{c,2}(n)$ may be decoded through a "real to complex" block. A "conversion" block may estimate $\hat{x}_{c,2}(n)$ as in the encoding process.

$$\tilde{x}'_{c,2}(n) = \frac{|\hat{x}_{c,1}(n)|e^{\angle x_{c,1}(n)-\theta_c}}{g_c} \quad \text{[Equation 7]}$$

When $$\tilde{x}'_{c,2}(n)$$

is obtained, $$\hat{x}_{c,2}^{type}(n)$$

may be obtained by adding $$\tilde{x}'_{c,2}(n) \text{ and } \hat{r}_{c,2}(n)$$

together. In the case of $r_{c,2}(n)==x_{c,2}(n)$ in the encoding process, $\hat{r}_{c,2}(n)$ may be used as $$\hat{x}_{c,2}^{type}(n)$$

without a change. Information related to the type may be received and processed as in the encoding process.

In the case of $$\hat{x}_{c,2}^{sum}(n),$$

Equation 8 may be applied.

$$\left(\hat{x}_{c,2}^{sum}(n) + \hat{x}_{c,1}^{diff}(n)\right) \times 0.5 = \text{real\_to\_complex}\{\hat{x}_1(n)\} \quad \text{[Equation 8]}$$

$$\left(\hat{x}_{c,2}^{sum}(n) - \hat{x}_{c,1}^{diff}(n)\right) \times 0.5 = \text{real\_to\_complex}\{\hat{x}_2(n)\}$$

In the case of $\hat{x}_{c,2}^{diff}(n)$, Equation 9 may be applied.

$$\left(\hat{x}_{c,2}^{diff}(n) + \hat{x}_{c,1}^{sum}(n)\right) \times 0.5 = \text{real\_to\_complex}\{\hat{x}_1(n)\} \quad \text{[Equation 9]}$$

$$\left(-\hat{x}_{c,2}^{diff}(n) + \hat{x}_{c,1}^{sum}(n)\right) \times 0.5 = \text{real\_to\_complex}\{\hat{x}_2(n)\}$$

$$\left(\hat{x}_{c,2}^{bypass}\right) = \text{real\_to\_complex}\{\hat{x}_2(n)\} \quad \text{[Equation 10]}$$

$$\left(\hat{x}_{c,1}^{bypass}(n)\right) = \text{real\_to\_complex}\{\hat{x}_1(n)\}$$

When one type is selected by Equations 8 to 10, a final output signal of a decoding device 102 may be determined as in Equation 11.

$$\text{complex\_to\_real}\{\text{real\_to\_complex}\{\hat{x}_2(n)\}\} = \hat{x}_2(n) \quad \text{[Equation 11]}$$

$$\text{complex\_to\_real}\{\text{real\_to\_complex}\{\hat{x}_1(n)\}\} = \hat{x}_1(n)$$

Figure 4:
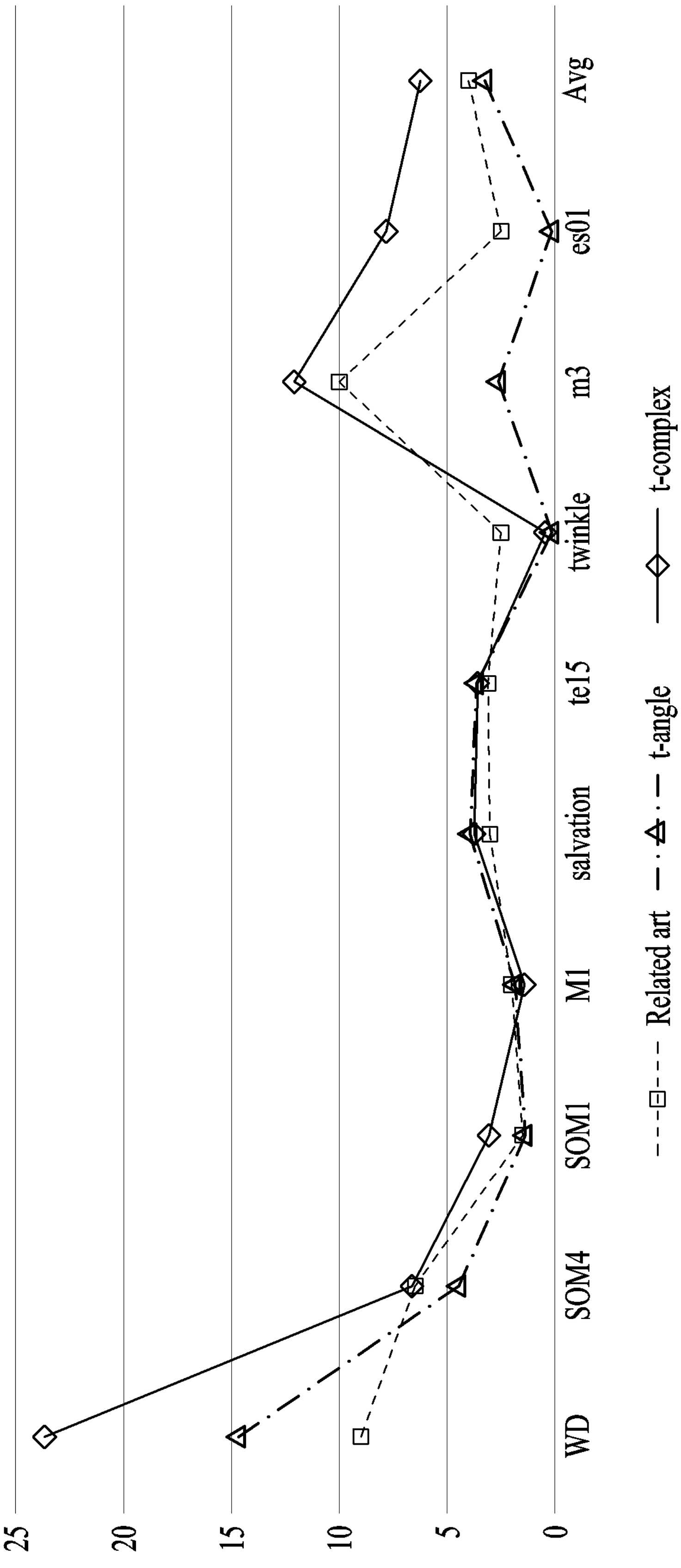
FIG. 4 is a diagram illustrating a result of improvement of performance according to an embodiment.

FIG. 4 is a diagram illustrating a result of improvement of performance according to an embodiment.

Since a necessary amount of bits of efficiency of audio encoding is determined according to a difference in an amount of input information, a reduction in an amount of information of a converted residual signal may be estimated from an SNR value. The below figure represents an SNR value according to audio content. Compared to a related art, a superior result may be observed on average. Here, t-angle is a result obtained when only a phase difference is corrected, and t-complex is a result of operation based on Equation 4.

The methods according to the present disclosure may be written by a computer-executable program and implemented as various types of recording media, such as magnetic storage media, optical reading media, digital storage media, and the like.

The techniques described herein may be implemented as digital electronic circuitry, hardware, firmware, software, and/or combinations thereof. The above techniques may be implemented as a computer program product, i.e., a computer program that is tangibly embodied in an information carrier, e.g., a machine-readable storage (a computer-readable medium) or a radio signal for processing by, or for controlling, the operation of a data processing apparatus, e.g., a programmable processor, computer, or a plurality of computers. A computer program, such as the computer program(s) described above, may be written in any form of programming language, including compiled or interpreted languages, and may be implemented as a stand-alone program or in a module, component, subroutine, or other units suitable for a use in a computing environment. A computer program may be deployed to be processed on one computer or multiple computers at one site or distributed across multiple sites and interconnected by a communication network.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described hardware devices may be configured to act as one or more software modules in order to perform the operations of the above-described examples, or vice versa.

In addition, computer readable media may be random available media that may be accessed by a computer, and may include both computer storage media and transmission media.

While this specification contains many specific implementation details, they should not be construed as limiting on the scope of any disclosure or what is claimed, but rather as a description of characteristics that may be unique to a particular embodiment of a particular disclosure. Certain characteristics that are described in this specification in the context of separate embodiments may also be implemented in combination in a single embodiment. Conversely, various characteristics that are described in the context of a single embodiment can also be implemented in a plurality of embodiments individually or in any suitable subcombination. Further, while characteristics may operate in particular combinations and be initially described as claimed herein, one or more characteristics from a claimed combination may in some cases be excluded from that combination, and the claimed combination may be changed to a subcombination. or variations of the subcombination.

Similarly, while the drawings illustrate operations in a specific order, it should not be understood that the operations must be performed in that specific order or a sequential order or that all illustrated operations must be performed to obtain desirable results. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. In some cases, multitasking and parallel processing may be advantageous. Moreover, a separation of various device components in the above embodiments should not be understood as requiring such separation in all embodiments. It should be understood that the described program components and devices may generally be integrated together into a single software product or packaged into multiple software products.

The embodiments disclosed herein are merely provided for descriptive purposes and should not be construed as limiting. It is obvious to one skilled in the art that various modifications based on the technical idea of the present disclosure may be made to the embodiments.

What is claimed is:

1. An encoding method, comprising:

converting a first channel signal $x_1(n)$ constituting an audio signal corresponding to a stereo signal from a real domain to a complex domain to a complex domain and outputting a first channel signal in a complex form;

converting a second channel signal $x_2(n)$ constituting an audio signal corresponding to a stereo signal from a real domain to a complex domain and outputting a second channel signal in a complex form;

performing one of a sum operation, a difference operation, and a bypass operation on the first channel signal in a complex form and the second channel signal in a complex form and outputting a computed first channel signal $x_{c,1}(n)$ and a computed second channel signal $x_{c,2}(n)$;

deriving a complex spatial cue from the computed first channel signal $x_{c,1}(n)$ and the computed second channel signal $x_{c,2}(n)$;

correcting a phase difference and a gain value of the computed first channel signal $x_{c,1}(n)$ with the complex spatial cue and outputting a differential signal $\hat{x}_{c,2}(n)$;

converting a residual signal $r_{c,2}(n)$ to a real domain, which is a difference between the computed second channel signal $x_{c,2}(n)$ and the differential signal $\hat{x}_{c,2}(n)$;

converting the computed first channel signal $x_{c,1}(n)$ to a real domain;

encoding the first channel signal converted to the real domain;

encoding the residual signal converted to the real domain;

performing gain estimation by comparing a power of the residual signal and a power of the computed second channel signal, and determining which operation to be performed among the sum operation, the difference operation, and the bypass operation on the second channel signal in a complex form using a $SNR^{type}$, which is an SNR of an estimated gain value, wherein the $SNR^{type}$ is determined according to Equation 5, and in Equation 5, sum, diff, bypass, which are the three types of $$x_{c,2}^{type}(n),$$

is determined according to Equation 6, $$SNR^{type} = \log_{10}\frac{pow\left(x_{c,2}^{type}(n)\right)}{pow\left(r_{c,2}^{type}(n)\right)} \quad \text{[Equation 5]}$$

$$x_{c,2}^{sum}(n) = \text{real\_to\_complex}\{x_1(n)\} + \text{real\_to\_complex}\{x_2(n)\} \quad \text{[Equation 6]}$$

$$x_{c,2}^{diff}(n) = \text{real\_to\_complex}\{x_1(n)\} - \text{real\_to\_complex}\{x_2(n)\}$$

$$x_{c,2}^{bypass}(n) = \text{real\_to\_complex}\ \{x_2(n)\}$$

wherein the determining which operation to be performed among the sum operation, the difference operation, and the bypass operation comprises:

determining the operation to be performed on the second channel signal in a complex form as a type having a largest SNR among SNRs for each operation defined in Equation 6;

defining $$x_{c,1}^{diff}(n)$$

when defined as $$x_{c,2}^{sum}(n)$$

in Equation 6; and defining $$x_{c,1}^{sum}(n)$$

when defined as $$x_{c,2}^{diff}(n)$$

in Equation 6.

2. An encoding device comprising a processor, wherein the processor is configured to:

convert a first channel signal $x_1(n)$ constituting an audio signal corresponding to a stereo signal from a real domain to a complex domain to a complex domain and outputting a first channel signal in a complex form;

convert a second channel signal $x_2(n)$ constituting an audio signal corresponding to a stereo signal from a real domain to a complex domain and outputting a second channel signal in a complex form;

perform one of a sum operation, a difference operation, and a bypass operation on the first channel signal in a complex form and the second channel signal in a complex form and outputting a computed first channel signal $x_{c,1}(n)$ and a computed second channel signal $x_{c,2}(n)$;

derive a complex spatial cue from the computed first channel signal $x_{c,1}(n)$ and the computed second channel signal $x_{c,2}(n)$;

correct a phase difference and a gain value of the computed first channel signal $x_{c,1}(n)$ with the complex spatial cue and outputting a differential signal $x_{c,2}(n)$;

convert a residual signal $r_{c,2}(n)$ to a real domain, which is a difference between the computed second channel signal $x_{c,2}(n)$ and the differential signal $\hat{x}_{c,2}(n)$;

convert the computed first channel signal $x_{c,1}(n)$ to a real domain;

encode the first channel signal converted to the real domain; and encode the residual signal converted to the real domain;

perform gain estimation by comparing a power of the residual signal and a power of the computed second channel signal; and determine which operation to be performed among the sum operation, the difference operation, and the bypass operation on the second channel signal in a complex form using a $SNR^{type}$ which is an SNR of an estimated gain value, wherein the $SNR^{type}$ is determined according to Equation 5, and in Equation 5, sum, diff, bypass, which are the three types of $$x_{c,2}^{type}(n),$$

is determined according to Equation 6, $$SNR^{type} = \log_{10}\frac{pow(x_{c,2}^{type}(n))}{pow(r_{c,2}^{type}(n))} \quad \text{[Equation 5]}$$

$$x_{c,2}^{sum}(n) = \text{real\_to\_complex}\{x_1(n)\} + \text{real\_to\_complex}\{x_2(n)\} \quad \text{[Equation 6]}$$

$$x_{c,2}^{diff}(n) = \text{real\_to\_complex}\{x_1(n)\} - \text{real\_to\_complex}\{x_2(n)\}$$

$$x_{c,2}^{bypass}(n) = \text{real\_to\_complex}\{x_2(n)\}$$

wherein the determining which operation to be performed among the sum operation, the difference operation, and the bypass operation comprises:

determining the operation to be performed on the second channel signal in a complex form as a type having a largest SNR among SNRs for each operation defined in Equation 6;

defining $$x_{c,1}^{diff}(n)$$

when defined as $$x_{c,2}^{sum}(n)$$

in Equation 6; and defining $$x_{c,1}^{sum}(n)$$

when defined as $$x_{c,2}^{diff}(n)$$

in Equation 6.

* * * * *